United States Patent [19]

Bickar

[11] Patent Number: 5,527,077
[45] Date of Patent: Jun. 18, 1996

[54] PITCHFORK RAKE ATTACHMENT

[76] Inventor: Mina Bickar, 7012 Lillooet Loop, Aberdeen, Wash. 98520

[21] Appl. No.: 366,758

[22] Filed: Dec. 30, 1994

[51] Int. Cl.⁶ ................................................. A01D 11/06
[52] U.S. Cl. ...................... 294/52; 294/55.5; 56/400.04
[58] Field of Search ............................ 294/51, 52, 55.5, 294/59, 50, 50.5; 56/400.01, 400.04, 400.05, 400.06, 400.07, 400.16, 400.21

[56] References Cited

U.S. PATENT DOCUMENTS

| | | | |
|---|---|---|---|
| 685,022 | 10/1901 | Williams | 294/52 |
| 705,008 | 7/1902 | Zwicker . | |
| 795,383 | 7/1905 | Arason . | |
| 894,491 | 7/1908 | Frees | 294/50 |
| 1,139,270 | 5/1915 | Gould . | |
| 1,185,426 | 5/1916 | Miller et al. . | |
| 1,374,800 | 4/1921 | Anderson | 56/400.04 |
| 1,474,650 | 11/1923 | Storr . | |
| 1,493,520 | 5/1924 | Clark . | |

*Primary Examiner*—Dean Kramer
*Attorney, Agent, or Firm*—Brian J. Coyne

[57] ABSTRACT

An attachment for converting a pitchfork into a combination pitchfork and rake. The attachment comprises a rake head having a plurality of apertures to receive the tines of a pitchfork, along which it is movable between a retracted and an extended position, and a linear array of rake prongs that depend from the rake bar. In a preferred embodiment, associated with each prong is a clevis attached to the rake bar to which the prong is pivotally mounted for free rotation about a horizontal axis during forward-directed scooping motions of the pitchfork along a ground surface when the attachment is in an extended position; during rear-directed, raking motions of the pitchfork, however, a lower portion of a front wall of the clevis permits rotation of the prong only up to a vertical position. Accordingly, the attachment provides a single tool capable of rapid and convenient alternation between raking and pitching motions.

4 Claims, 3 Drawing Sheets

PITCHFORK RAKE ATTACHMENT

BACKGROUND OF THE INVENTION

1. Field of the Invention

The present invention relates to tools that are combination pitchforks and rakes, and more specifically, to a rake head attachment reversibly movable along the tines of a pitchfork between a retracted position and an extended position, and which in the extended position simultaneously provides the capabilities of both a rake and pitchfork.

2. Description of the Prior Art

A tool that combines the functions of both a pitchfork and a rake is desirable for certain kinds of chores, for example, cleaning the floor of a horse or other large animal stall. Such a combination tool permits one to alternately scrape material loose from the floor with the rake portion of the tool, and then pitch it into a container for hauling away—all without ever having to exchange a pitchfork for a rake or vice-versa. For those chores that require a pitchfork only, however, the rake portion of the combination tool preferably should be movable to a retracted position so as not to interfere with the tines of the pitchfork engaging the material to be pitched.

Pitchfork and rake combination tools have been previously described. Storr, U.S. Pat. No. 1,474,650 (Nov. 20, 1927), disclosed a tool that combined a crosspeice mounted on one end of a handle and provided with rigid tines, with a sleeve provided with tines adapted to lie between the stationary tines and mounted for limited rotation on the crosspeice. The tool functioned solely as a pitchfork when the rotatable tines were locked parallel to the rigid tines, but served as both a rake and a pitchfork when the rotatable tines were locked into a position substantially perpendicular to the rigid tines. A disadvantage of Storr's tool was that when the rotatable tines were in the latter position they interfered with forward-directed scooping motions of the tool at ground surface inasmuch as they would scrape or dig into the surface of the ground.

Zwicker, U.S. Pat. No. 705,008 (Jul. 15, 1902), disclosed a rake head adapted to slide along the tines of a pitchfork between a retracted and an extended position. The rake teeth being rigid, however, they likewise interfered with scooping motions of the pitchfork at ground surface.

Arason, U.S. Pat. No. 795,383 (Jul. 25, 1905), and Clark, U.S. Pat. No. 1,493,520 (May 13, 1924), disclosed combination rake and fork tools having a single set of tines movable from a position parallel to the handle of the tool to a position perpendicular thereto, thereby providing the utility of a pitchfork and of a rake, respectively. These tools were not convenient to use because alternating between raking and pitching required repetitive changes in the position of the tines. The combination rake and fork tool of Gould, U.S. Pat. No. 1,139,270 (May 11, 1915), a rake of conventional design upon which a pitchfork head was mounted for sliding movement between a retracted and extended position, suffered from the same disadvantage.

Miller, et al., U.S. Pat. No. 1,185,426 (May 30, 1916), disclosed a combined rake and pitchfork tool having a rake head transversely mounted to one end of a tubular handle and having a plurality of perforations. A fork head, comprising parallel tines inserted through the perforations of the rake head, was slidably mounted on the handle. Miller's tool served solely as a rake when the fork head was retracted, and served as both a pitchfork and a rake when the fork head was extended. A disadvantage of this tool was that alternating between raking and pitching required repeated inversion of the rakehead.

My invention is directed to a rake attachment for a pitchfork of conventional design that efficiently performs its intended purpose and without the aforementioned drawbacks.

SUMMARY OF THE INVENTION

The present invention is a rake attachment for converting a conventional pitchfork to a combination pitchfork and rake. The rake attachment includes a transverse rake bar having a plurality of perforations or rings to permit sliding movement of the rake attachment along the tines of a pitchfork between a retracted and an extended position, and a plurality of rake prongs that depend from the rake bar. Each of the prongs is pivotally attached to the rake bar for limited rotation only, such that the prongs pivot rearward during forward-directed scooping motions of the pitchfork adjacent a ground surface; on the other hand, during rear-directed raking motions, the prongs pivot to a substantially vertical position for scraping the ground surface. In a preferred embodiment of the attachment, a clevis attached to a lower surface of the rake bar is provided for pivotal attachment of each prong to the rake bar. The clevises each include a front wall that prevents the prongs from rotating past a vertical position during rear-directed raking motions. An extender rod having a handle at one end is attached at an opposite end to the rake bar for extending and retracting the attachment with respect to the pitchfork. Thus, with the rake attachment in an extended position, raking and pitching movements can be rapidly and conveniently alternated without requiring either inversion of the pitchfork or adjustment of the position of the rake attachment, and without the rake prongs interfering with forward-directed scooping motions of the pitchfork.

OBJECTS OF THE INVENTION

An object of the present invention is to provide an attachment for a pitchfork to convert the pitchfork to a combination pitchfork and rake.

Another object is to provide an attachment of the kind described for a pitchfork that is movable with respect to the pitchfork between a retracted position and an extended position.

Still another object is to provide such an attachment for a pitchfork as will not interfere with forward-directed scooping motions of the pitchfork at a ground surface.

A still further object is to provide an attachment for a pitchfork that, when in an extended position, permits rapid alternation between forward-directed scooping motions and rear-directed raking motions of the pitchfork without requiring either inversion of the pitchfork or adjustment of the position of the attachment with respect to the pitchfork. Additional objects and advantages of my rake attachment are its ease of manufacture, durability and light weight.

Other objects, advantages, and novel features of my invention will become apparent from the following detailed description of my invention when studied in conjunction with the accompanying drawings.

BRIEF DESCRIPTION OF THE DRAWINGS

With reference to FIG. 1, the terms "front" and "forward" shall refer to the right sides, and the terms "rear" and "rearward" shall refer to the left sides, of those figures, respectively.

DETAILED DESCRIPTION OF THE ILLUSTRATED EMBODIMENT

Figure 1:
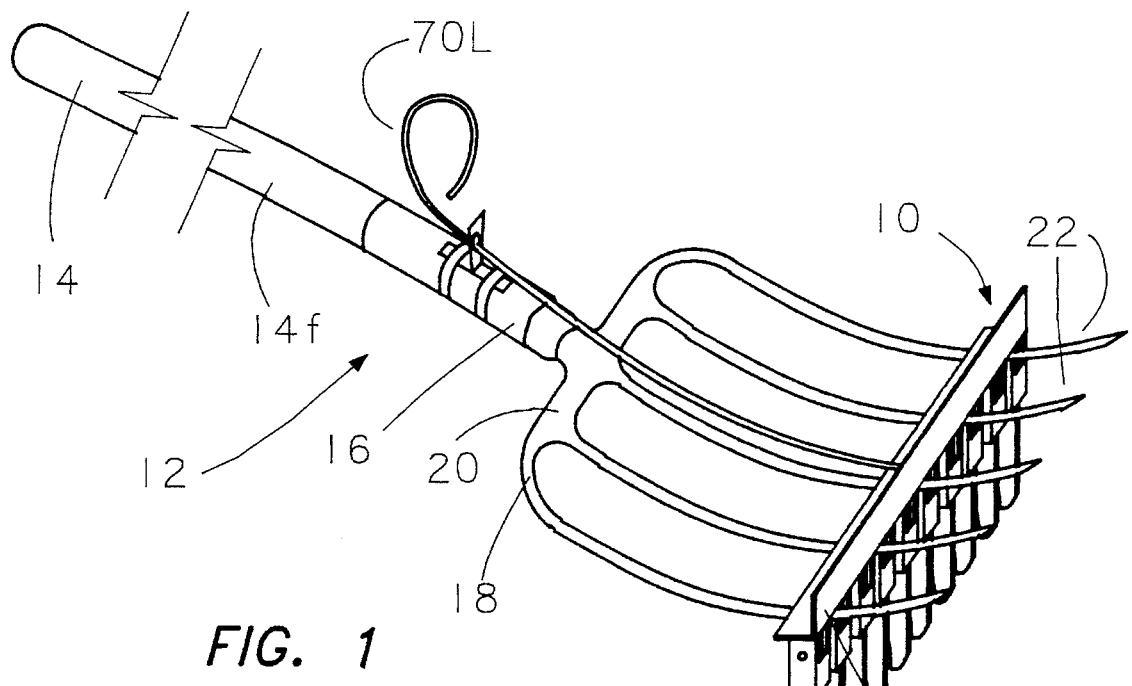
FIG. 1 is a side perspective view of a pitchfork converted to a combination pitchfork and rake by my attachment and depicting the attachment in an extended position.
Figure 2:
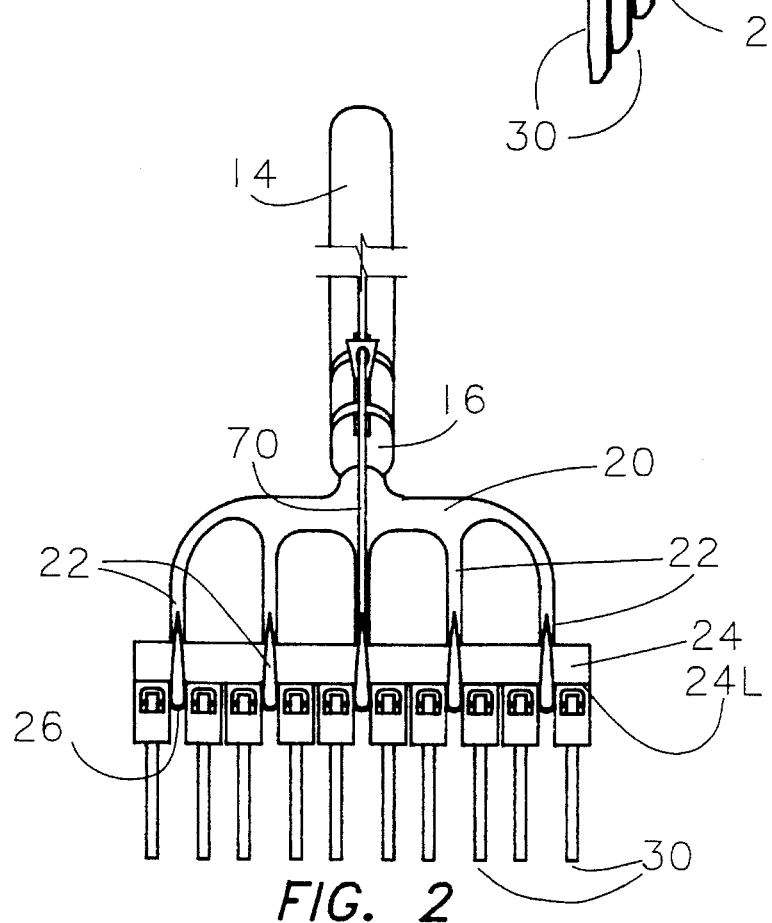
FIG. 2 is a front view thereof.
Figure 3:
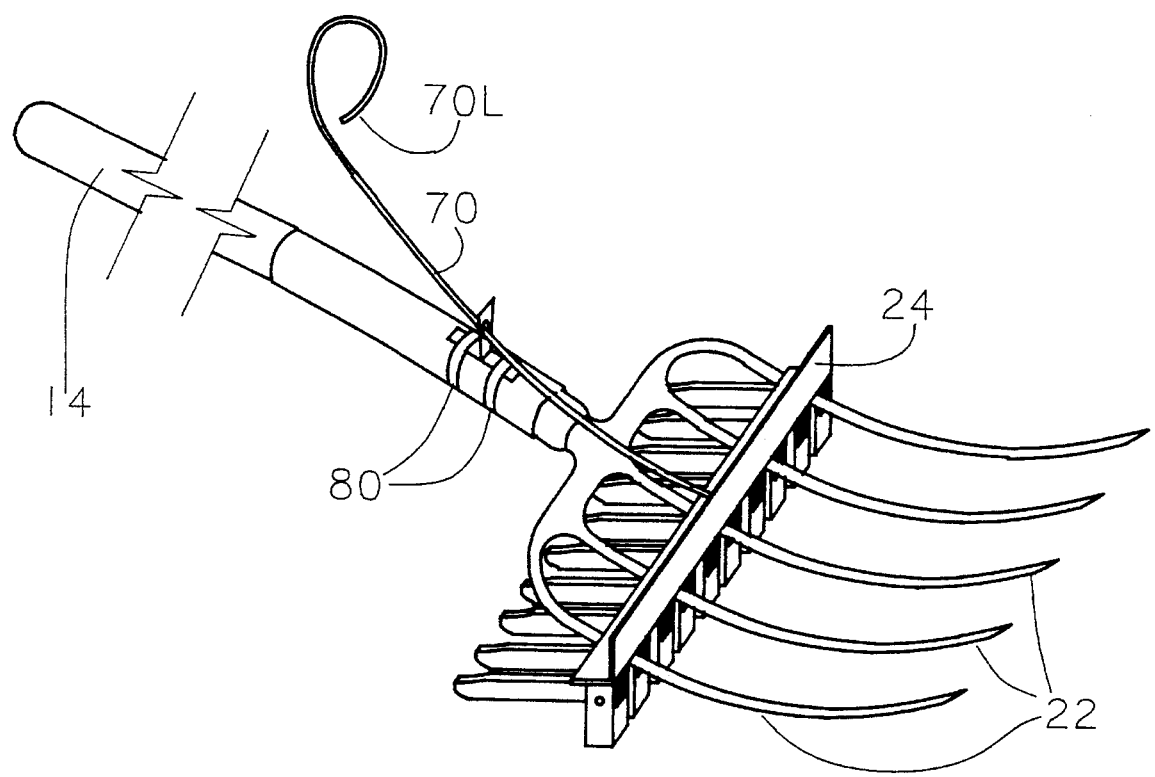
FIG. 3 is a side perspective view thereof and depicting the attachment in a retracted position.

A rake attachment 10 is illustrated in FIG. 1, as applied to a pitchfork 12 of conventional construction having an elongated, tubular handle 14 with a forward end 14f thereof inserted into a ferrule 16 of a fork head 18. The fork head 18 includes a transverse crosspeice 20 integral with a plurality of spaced-apart tines 22 that project forwardly from the cross-peice 20. The rake attachment 10 includes a transverse rake bar 24 that spans the width of the rake head 18 and is adapted for sliding movement along the tines 22 between a retracted position, as illustrated in FIG. 3, and an extended position as illustrated in FIG. 1, with respect to the pitchfork 12. The rake bar 24 is preferably constructed from material having an L-shaped cross-section, e.g., angle iron, and has spaced-apart apertures or rings 26 through which the tines 22 are inserted when the attachment 10 is mounted on a pitchfork 12. The rake attachment 10 further includes a plurality of rake prongs 30, linearly spaced apart and depending from the rake bar 24. Since it is desired that the lower portions 30L of the prongs 30 should pivot rearward when the prongs 30 make contact with a ground surface during forward-directed scooping motions of the pitchfork 12, and should pivot to a vertical position, but no more, during rearward-directed raking motions, the attachment 10 further includes combination partial-pivot-and-stop means for attaching each of the rake prongs 30 to the rake bar 24.

Figure 4:
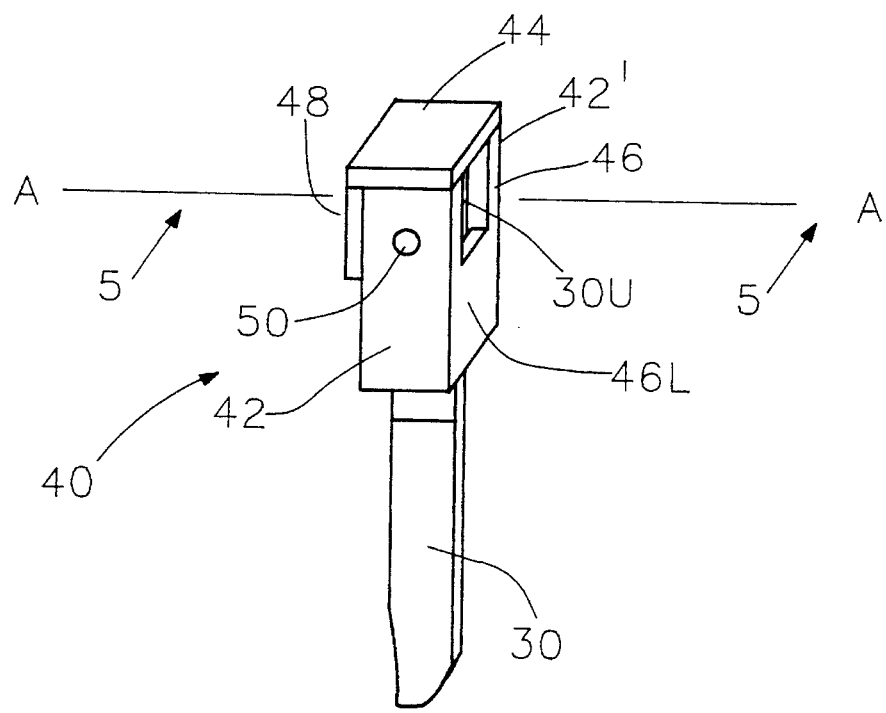
FIG. 4 is an enlarged, perspective view of a rake prong pivotally suspended from a clevis that has been removed from the rake bar of my attachment.
Figure 5:
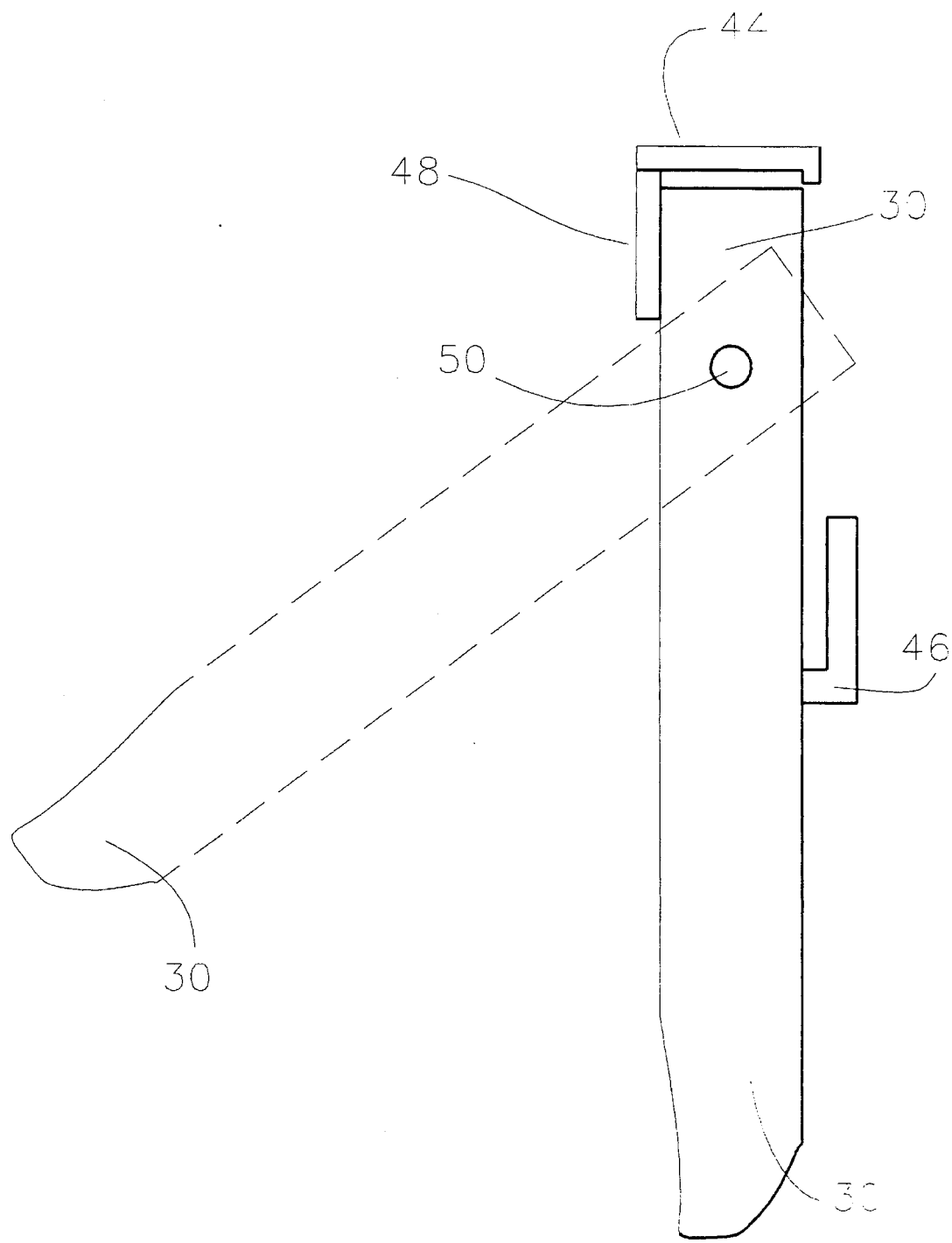
FIG. 5 is a cross-sectional view along section 5—5 of FIG. 4, showing a rake prong in vertical position abutted against a front wall of the clevis, and showing in dotted outline a lower portion of the rake prong pivotted rearward.

In a preferred embodiment, the combination partial pivot-and-stop means for attaching each rake prong 30 to the rake bar 24 comprises a clevis 40 attached to a lower surface 24L of the rake bar 24. Referring now to FIGS. 4 and 5, a clevis 40 is depicted having a pair of side walls 42, 42', top wall 44, and front wall 46. A rake prong 30 is shown rotatably mounted on a transverse pivot pin 50 that spans the distance between the side walls 42, 42', and to which the pin 50 is attached. A central portion of the front wall 46 is cut out to form a window, which permits forward movement of an upper portion 30U of the prong 30 when a lower portion 30L of the prong 30 pivots rearward, as shown in dotted outline in FIG. 5. During rearward-directed raking movements the prong 30 will engage a ground surface, which will urge the prong 30 to pivot past the vertical position. Nevertheless, the prong 30 will not pivot past the vertical position because a lower portion 46L of the front wall 46 presents a barrier to further forward movement of lower portion 30L of the prong 30. The clevises 40 are attached to the rake bar 24 by suitable fasteners, such as rivets, or by welding.

My attachment 10 further comprises an upstanding lug 60 attached to the ferrule 16 or to a forward portion of the handle 14, as by a pair of ring clamps 80, for example. The lug 60 has a keyway cut out through which is inserted an extender rod 70. A forward end of the rod 70 is attached to a central portion of the rake bar 24, and a rear end of the rod 70 is shaped to form a handle, for example, loop 70L.

In use, starting with my attachment in a retracted position, the extender rod 70 is pushed forward until the loop 70L engages the lug 60, which positions the prongs 30 near a forward end of the fork head 18. By gravity alone, the prongs 30 will orient vertically so long as they do not engage the ground surface. During raking motions, that is, rearward tugs on the handle 14, the prongs 30 remain vertical. During forward-directed scooping movements of the pitchfork 12, contact with the ground surface causes the lower portion 30L of the prongs 30 to pivot rearward, thereby avoiding interference with such movements.

All components of my rake attachment 10 are preferably made from rust-resistant metal, and most preferably aluminum to achieve light weight. Various modifications and variations will become obvious to those skilled in the art. It is the intent these changes and modifications are to be encompassed within the spirit of the appended claims and that the invention described herein and shown in the accompanying drawings are illustrative only and are not intended to limit the scope of the invention.

I claim:

1. A rake attachment for a pitchfork equipped with a a plurality of tines mounted on a forward end of a handle, comprising:

a rake bar having a plurality of apertures disposed thereon to receive the tines of the pitchfork;

a plurality of rake prongs;

a combination partial-pivot-and-stop means for attaching each of the rake prongs to the rake bar in a spaced, linear array for pivoting thereon from a vertical position to a rear-directed, substantially horizontal position when the pitchfork is pushed forward along the ground, and back to a vertical position when the pitchfork is pulled rearward along the ground; and manual means for moving the rake bar along the tines of the pitchfork between a retracted position and an extended position.

2. The rake attachment of claim 1 wherein the combination partial-pivot-and-stop means for attaching each rake prong to the rake bar comprises:

a clevis having a pair of side walls, a top wall spanning the side walls, and a front wall spanning the side walls; and a transverse pin mounted between the side walls; said clevis being rigidly attached to, and dependent from, the rake bar, the pin being inserted through a transverse aperture in an upper portion of a rake prong, a central portion of the front wall having a window that permits forward rotation of the upper portion of the rake prong when an opposite, lower portion of the rake prong rotates rearward about the pin, a lower portion of the front wall below the window, however, permitting forward rotation of the lower portion of the rake prong to at most a vertical position.

3. The rake attachment of claim 2 wherein the manual means for moving the rake bar and attached rake prongs along the tines of the pitchfork between a retracted position and an extended position, comprises:

an upstanding lug attached to a forward portion of the handle and having a keyway cutout; and an extender rod;

and wherein a forward portion of the extender rod is attached to the rake bar and a rear portion of the extender rod is inserted through the keyway cutout.

4. The rake attachment of claim 3 wherein a rear portion of the extender rod is looped to facilitate grasping, pushing and pulling the extender rod.

* * * * *